(12) United States Patent
Herborth et al.

(10) Patent No.: US 7,858,879 B2
(45) Date of Patent: Dec. 28, 2010

(54) INSULATED ARTICLE AND METHOD OF MAKING SAME

(75) Inventors: Jason Todd Herborth, Acton (CA); Vittorio Bruno, Mississauga (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 0 days.

(21) Appl. No.: 12/433,244

(22) Filed: Apr. 30, 2009

(65) Prior Publication Data

US 2009/0205738 A1    Aug. 20, 2009

Related U.S. Application Data

(62) Division of application No. 11/283,838, filed on Nov. 22, 2005, now Pat. No. 7,544,890.

(51) Int. Cl.
*H02G 3/04* (2006.01)
(52) U.S. Cl. .................. 174/68.1; 174/68.3; 174/481; 174/72 A; 248/74.3; 248/68.1; 392/480

(58) Field of Classification Search .............. 174/68.1, 174/68.3, 72 R, 135; 248/74.3, 68.1; 439/451; 392/480, 465, 468; 138/33
See application file for complete search history.

(56) References Cited

U.S. PATENT DOCUMENTS 2,393,496 A * 1/1946 Stedman ................. 138/126
4,590,108 A * 5/1986 Nippe ..................... 138/149

* cited by examiner

*Primary Examiner*—Dhiru R Patel
(74) *Attorney, Agent, or Firm*—Ogilvy Renault LLP

(57) ABSTRACT

A tube is thermally insulated for protecting a fluid flowing therethrough from a high includes temperature surrounding environment of a gas turbine engine. The tube includes a conduit, an insulating layer wrapped around the conduit, and an elongated contractible braided sleeve for preventing a separation of the insulating layer from the rigid conduit. The contractible braided sleeve is flexible along a longitudinal axis thereof and removably pulled over the insulating layer to snugly surround and maintain the insulating layer around the conduit.

12 Claims, 4 Drawing Sheets

INSULATED ARTICLE AND METHOD OF MAKING SAME

RELATED APPLICATIONS

This application is a divisional application of U.S. patent application Ser. No. 11/283,838 filed Nov. 22, 2005 now U.S. Pat. No. 7,544,890 issued on Jun. 9, 2009.

TECHNICAL FIELD

The invention relates generally to insulated articles, such as insulated tubes for operation in high temperature environments.

BACKGROUND OF THE ART

One example of known insulated tubes operating in a high temperature environment comprises a rigid conduit surrounded by insulation material, which is in turn surrounded by a rigid custom formed heat shield. The heat shield is generally composed of opposed sections each covering half a circumference of the conduit, the edges of which are welded together to form the complete shield. In addition to being complex to produce, these heat shields generally require special tooling and techniques to be installed as well as to be removed when the conduit needs to be inspected.

It is also known to surround flexible hoses with braided sleeves, often made of metal, in order to provide structural integrity to the hose. Thus, the braided sleeve acts to strengthen the flexible hose. When the hose needs to be insulated, the braided sleeve is usually surrounded by a layer of insulating material. An additional layer is often required around the insulating material to protect it from its environment.

SUMMARY OF THE INVENTION

It is therefore an object of this invention to address the above mentioned issues.

In one aspect, the present invention provides a method of insulating an article comprising: surrounding at least a portion of the article with an insulating layer; inserting the portion of the article surrounded by the insulating layer into an outer protective sleeve; and shrinking the outer protective sleeve around the insulating layer to compress and hold the insulating layer around the portion of the article.

In another aspect, the present invention provides an insulated tube comprising: an inner conduit; a thermal insulation layer disposed around and in contact with the inner conduit; and a removable protective outer sleeve surrounding and compressing the thermal insulation layer around the inner conduit, the protective outer sleeve providing assistance in holding the thermal insulation layer on the inner conduit.

In another aspect, the present invention provides an insulated tube comprising: a rigid conduit defining at least one bend; insulation means for at least partially insulating the conduit, the insulation means being flexible and surrounding the rigid conduit along at least a longitudinal portion thereof including the bend; and an elongated contractible sleeve for preventing a separation of the insulation means from the rigid conduit, the contractible sleeve being longitudinally flexible and removably pulled over the insulation means to snugly surround and maintain the insulation means around the longitudinal portion of the conduit.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
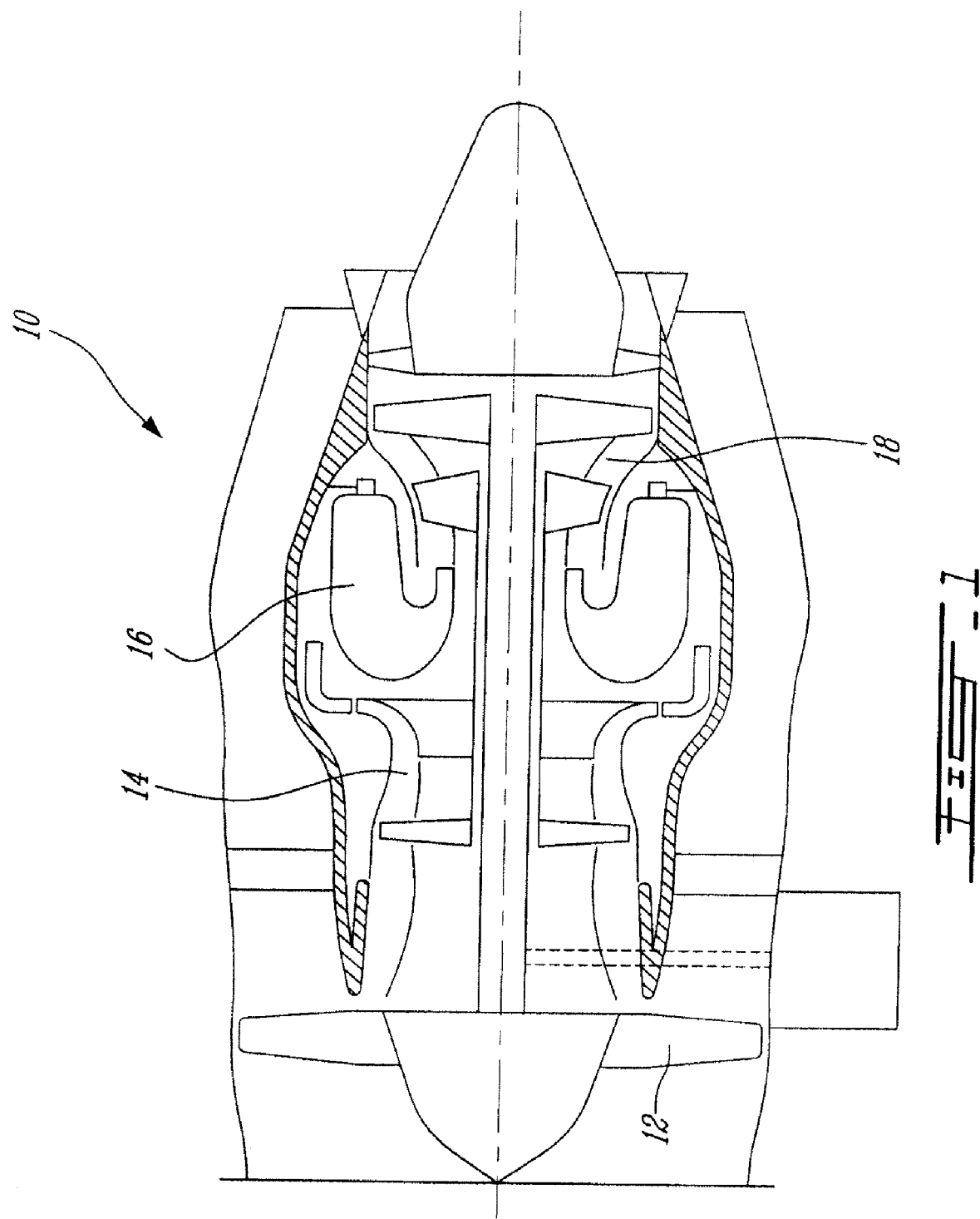
FIG. 1 is a schematic side view of a gas turbine engine, illustrating an example of an environment where an insulated tube according to one particular aspect of the present invention can be used.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Figure 2:
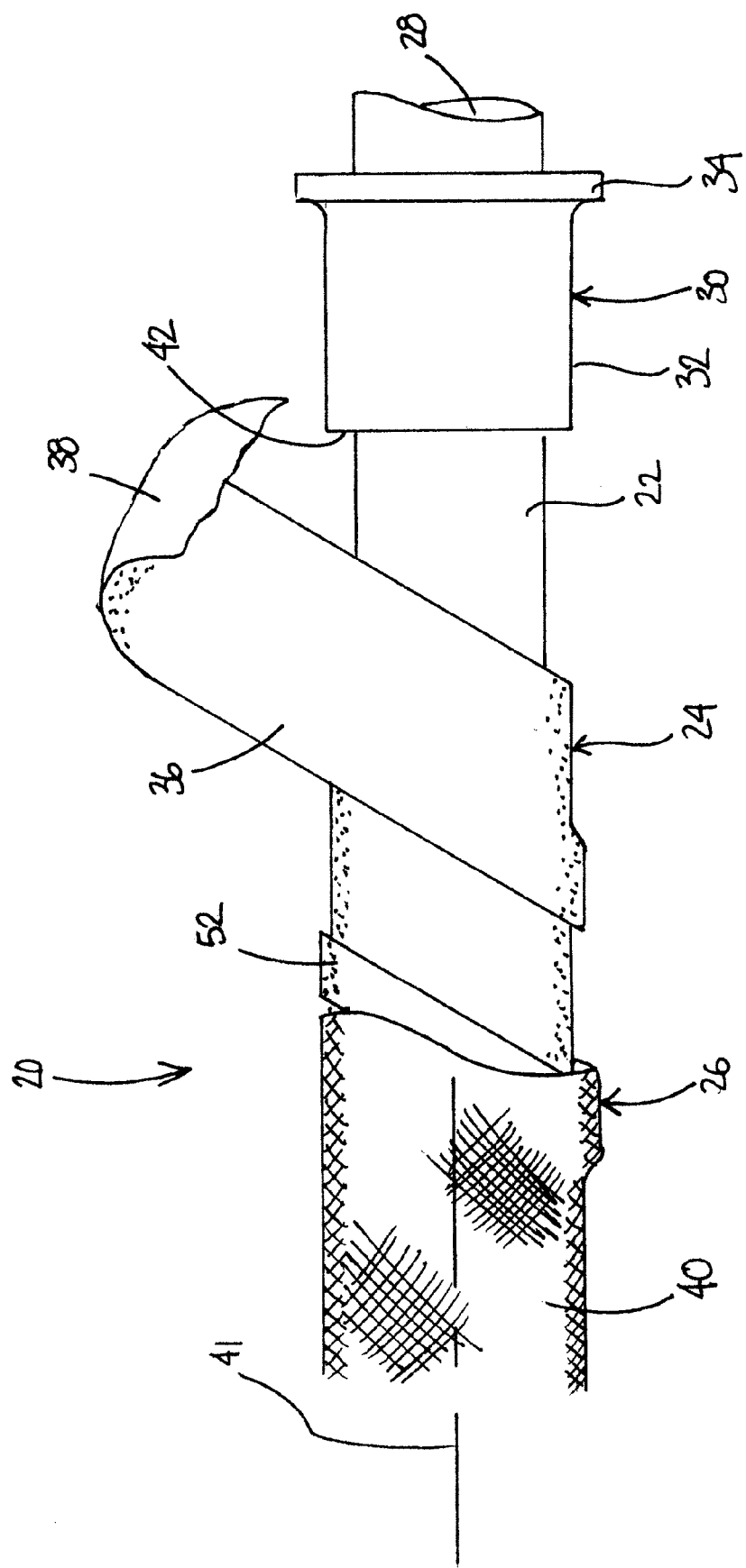
FIG. 2 is a side view of a partially assembled insulated tube according to one particular aspect of the present invention.
Figure 3:
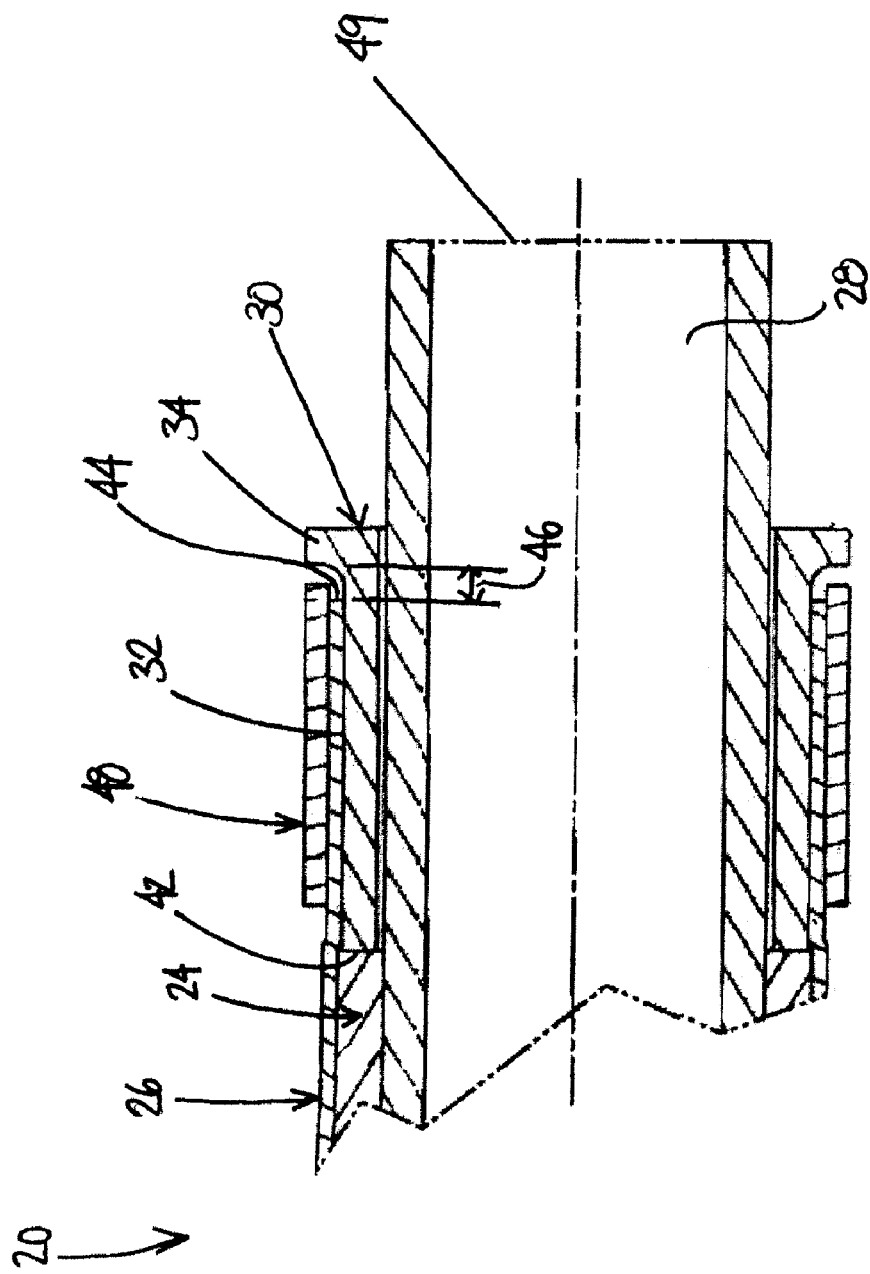
FIG. 3 is a cross-sectional view of a portion of the insulated tube of FIG. 2 in an assembled state.
Figure 4:
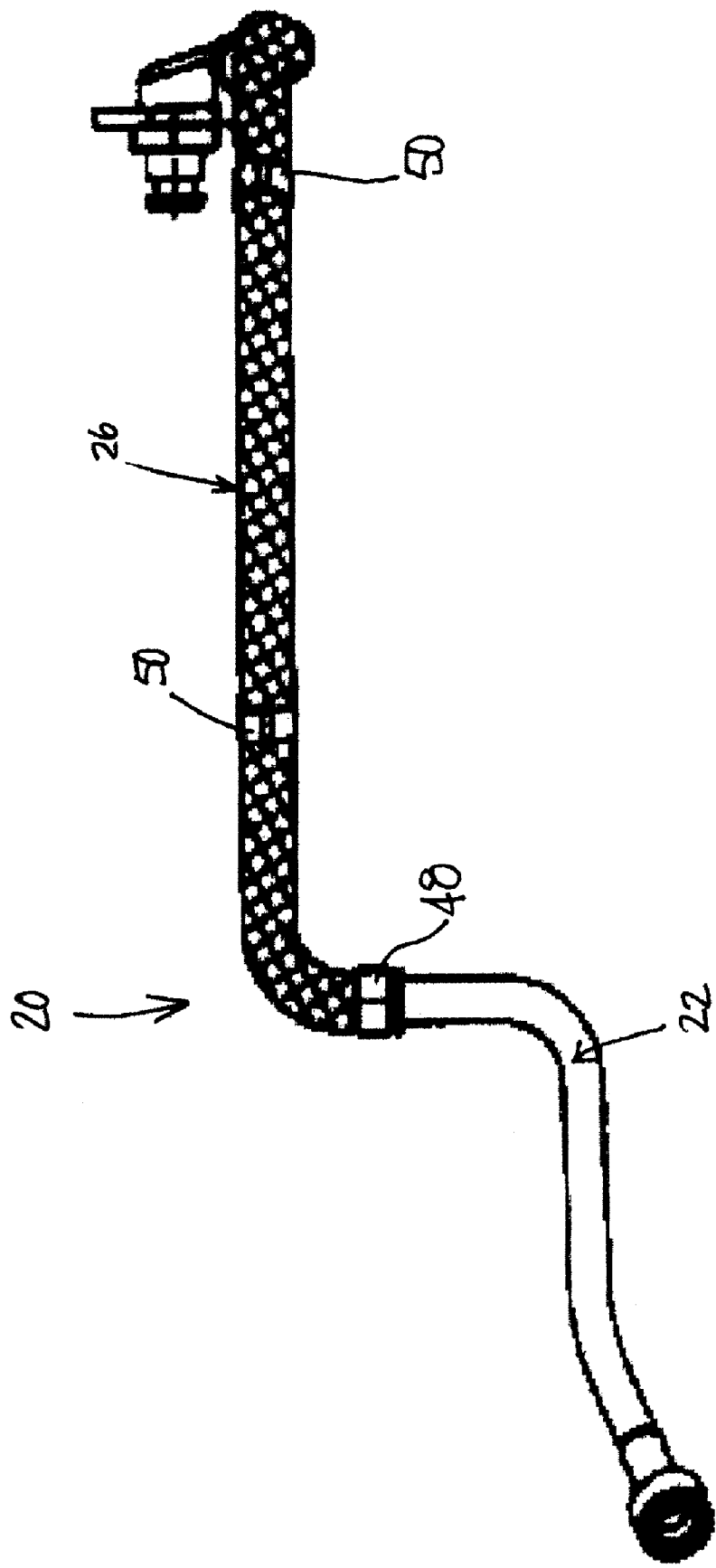
FIG. 4 is a perspective view of the insulated tube of FIG. 3.

FIGS. 2-4 illustrates an insulated tube 20 which can be used in the gas turbine engine 10 to carry oil to bearing assemblies located in a hot portions thereof, for example in proximity of the combustor 16. However, the gas turbine engine 10 shown is merely an example of an environment for the tube 20, the tube 20 being intended to be used in a number of other applications where a conveyed fluid needs to be insulated from a different temperature environment, whether hotter or colder than the fluid, and where heat exchange between the fluid and the environment needs to be minimized.

Referring particularly to FIG. 2, the insulated tube 20 comprises a conduit 22, surrounded by a thermal insulation layer 24, which is, in turn, surrounded by a protective layer 26.

The conduit 22 defines a flow path 28 for the conveyed fluid. The conduit 22 is rigid, made of a resistant material, for example metals such as stainless steel, nickel-based alloys, titanium, aluminium or copper, and is sized to resist the pressure of the fluid conveyed through the flow path 28. The conduit 22 includes a number of spaced-apart rigid sleeves 30, only one of which is shown in FIG. 2, attached around the conduit 22 for example through brazing or welding. Each rigid sleeve 30 defines a cylindrical receiving surface 32 around the conduit 22 and includes a raised border 34 around one edge thereof such as to have a "L"-shaped cross-section, the purpose of which will be explained further below.

In one particular aspect and as shown in FIG. 2, the thermal insulation layer 24 is made of an insulating tape 36 having an adhesive back 38 to adhere the thermal insulation layer 24 around the conduit 22 and facilitate the wrapping thereof. The material of the thermal insulation layer 24 is selected according to the thermal requirements of the insulated tube 20 and can be, for example, glass fiber insulation tape, tape including ceramic material, silica-based fiber tape, or any other similar tape. In one particular aspect, the thermal insulation layer 24 surrounds at least a longitudinal portion of the conduit 22 located within the different temperature environment. As shown in FIG. 3, the thermal insulation layer 24 surrounds the conduit 22 and abuts the rigid sleeve 30 along an edge 42 of the sleeve 30 opposite the border 34.

As shown in FIG. 2, the protective layer 26 protects at least partially the thermal insulation layer 24 against damage from the environment and acts as a retaining means to retain the thermal insulation layer 24 by compressing it against the conduit 22. The protective layer 26 is in the form of a sleeve which is shrinkable onto the thermal insulation layer 24. In one particular aspect, the protective layer 26 includes an elongated braided sleeve 40. The material of the braided sleeve 40 is selected according to the environment and can include, for example, densely woven, high temperature glass fibers, a stainless steel braid, nickel-plated copper braid, silver-plated copper braid, heat-treated aluminium coated fibreglass braid, etc. The braided sleeve 40 is braided such as to be shrinkable, with its diameter increasing when the braided sleeve 40 is compressed along a longitudinal axis 41 thereof, the diameter decreasing when the braided sleeve 40 is tensioned along the same direction, such as to facilitate installation of the braided sleeve 40 around the thermal insulation layer 24. Other types of sleeves are also possible for the protective layer 26, including sleeves which can be shrunk around the insulation layer 24 through various processes. As shown in FIG. 3, the protective layer 26 surrounds the thermal insulation layer 24 and the receiving surface 32 of the rigid sleeve 30 of the conduit 22, with an outer edge 44 of the protective layer 26 extending on the receiving surface 32 spaced-apart from the border 34, leaving a gap 46 therebetween.

As can be seen in FIG. 3, a clamp 48 surrounds the protective layer 26 around the receiving surface 32, and compresses the protective layer 26 against the receiving surface 32 to retain the protective layer 26 in place around the conduit 22. In one particular aspect, the clamp 48 covers at least part of the gap 46 such as to protect the outer edge 44 of the protective layer 26 against damage, and also to protect a user from potential injury through contact with the outer edge 44. Thus, one conduit rigid sleeve 30 and one clamp 48 is provided to secure each free edge 44 of the protective layer 26. Advantageously, the border 34 of the rigid sleeve 30 prevents the clamp 48 from sliding toward an adjacent end 49 of the conduit 22. In an alternative aspect, the rigid sleeves 30 can be omitted and the clamps 48 compress the protective layer 26 directly around and against the conduit 22. As can be seen in FIG. 4, additional clamps 50 can also be provided along the length of the conduit 22 to compress the protective layer 26 around and against the conduit 22. Alternately, the clamps 48, 50 can be replaced by other types of adequate attachment means, such as for example a wire-tie wrap made of a material resistant to the environment of the insulated tube 20 and compressing the protective layer 26 around and against the conduit 22.

In use, and as seen in FIG. 2, the conduit 22 is first surrounded by the thermal insulation layer 24. This can be done by wrapping the insulating tape 36 by hand around the conduit 22 with an overlap 52 selected according to the thermal requirements of the insulated tube 20, until the tape 36 abuts the edge 42 of the rigid sleeve 30 of the conduit 22. The thermal insulation layer 24 is then surrounded by the protective layer 26. This is done by inserting the conduit 22 wrapped in the thermal insulation layer 24 into the sleeve of the protective layer 26, then shrinking the protective layer 26 to compress the insulation layer 24 therewith. One example of this is compressing the braided sleeve 40 along its longitudinal axis 41 to increase its diameter, inserting the conduit 22 wrapped in the thermal insulation layer 24 into the braided sleeve 40, and tensioning the braided sleeve 40 along its longitudinal axis 41 to reduce its diameter until the braided sleeve 40 snugly surrounds and compresses the thermal insulation layer 24 and the receiving surfaces 32 of the spaced apart conduit rigid sleeves 30. If required, the protective layer 26 is then attached to the conduit 22 such as to prevent separation of the thermal insulation layer 24 from the conduit 22. This can be done by looping one of the clamps 48 around each free edge 44 of the braided sleeve 40 and tightening it to compress the braided sleeve 40 against and around the receiving surface 32 of the respective rigid sleeve 30, thus maintaining the sleeve 40 in a longitudinally tensioned state such that the sleeve 40 continues to compress the insulation layer 24. Optionally, the additional clamps 50 are installed between consecutive rigid sleeves 30 to compress the braided sleeve 40 around and against the conduit 22 wrapped in the thermal insulation layer 24.

Thus, the insulated tube 20 allows for a fluid to be conveyed while minimizing heat exchanges between the fluid and the environment of the insulated tube 20, whether the environment is hot or cold. The installation of the thermal insulation layer 24 and protective layer 26 around the conduit 22 can be done quickly and by hand, using off-the-shelf material, without the need for special tooling or joining techniques (e.g. seam welding). Since no welding is necessary in installing the layers 24, 26, risk of damage to the conduit 22 during assembly of the insulated tube 20 is greatly reduced. The materials and process used in the assembly of the insulated tube 20 also contribute to reducing fabrication costs. Moreover, the layers 24, 26 can be easily removed for inspection of the conduit 22, and the conduit 22 can be easily re-insulated without the need for special tools or techniques.

The flexibility and versatility of the layers 24, 26 allows rigid conduits 22 even with complex shapes to be easily insulated. Although the thermal insulation layer 24 and protective layers 26 have been described as surrounding a rigid conduit 22 to produce an insulated tube 20, it is to be understood that other type of conduits can be similarly insulated, as well as a variety of other types of articles, such as for example wire harnesses, cables, various solid articles, etc.

As the protective layer 26 surrounds and retains the thermal insulation layer 24, the thermal insulation layer 24 is prevented from being separated from the conduit 22, even if the environment of the insulated tube 20 damages the thermal insulation layer 24, for example by breaking down the fibers of its insulation or decomposing its adhesive. Since the conduit 22 is rigid, the protective layer 26 does not play a structural role, as opposed to when braided sleeves are used around flexible hoses to maintain structural integrity, which results in possibility of using a cheaper braided sleeve (e.g. thinner, less resistant, etc.).

The above description is meant to be exemplary only, and one skilled in the art will recognize that changes may be made to the embodiments described without department from the scope of the invention disclosed. Modifications which fall within the scope of the present invention will be apparent to those skilled in the art, in light of a review of this disclosure, and such modifications are intended to fall within the appended claims.

What is claimed is:

1. A thermally insulated tube for conducting a fluid in a high temperature environment of a gas turbine engine, the tube comprising:

a conduit defining a flow path for conveying the fluid through the high temperature environment of the gas turbine engine, the conduit having an outer surface;

a thermal insulation layer disposed around the conduit and having an inner surface in contact with the outer surface of the conduit, the thermal insulation layer comprising an insulating tape having an adhesive back provided on said inner surface and adhering directly to the outer surface of the conduit, the adhesive back being bonded to the outer surface of the conduit, thereby preventing separation of the thermal insulation layer from the conduit; and a removable protective layer surrounding and securely compressing the thermal insulation layer around the conduit, the protective layer comprising an expendable braided sleeve reversibly shrunk around the insulating tape, the braided sleeve being removable to provide access to the insulating tape on the conduit.

2. The insulated tube defined in claim 1, wherein the expendable braided sleeve is configurable between and expended state in which an inner diameter of the braided sleeve is greater than an outside diameter defined by the insulating tape on the conduit, and a contracted state in which the braided sleeve provides assistance in holding the thermal insulation layer on the conduit.

3. The insulated tube as defined in claim 1, wherein the conduit is rigid.

4. The insulated tube as, defined in claim 3, wherein the thermal insulation layer consists of an insulating adhesive backed tape wrapped around the rigid conduit.

5. The insulated tube as defined in claim 4, wherein the tape is one of glass fiber insulation tape, tape including ceramic material and silica-based fiber tape.

6. The insulated tube as defined in claim 1, wherein the braided sleeve comprises a material selected from the group consisting of: high temperature glass fibers, stainless steel, nickel-plated copper, silver-plated copper, and heat-treated aluminium coated fibreglass.

7. The insulated tube as defined in claim 1, further comprising at least two spaced-apart clamps compressing the removable protective layer around and against the conduit.

8. A thermally insulated tube for protecting a fluid flowing through the tube from a high temperature surrounding environment of a gas turbine engine, the insulated tube comprising:

a rigid conduit defining at least one bend;

an insulating layer wrapped around the rigid conduit along at least a longitudinal portion thereof including the bend, the insulating layer having an adhesive provided on an inner face thereof and adhering to an outer surface of the rigid conduit; and an elongated contractible braided sleeve preventing a separation of the insulating layer from the rigid conduit, the contractible braided sleeve being flexible along a longitudinal axis thereof and removably pulled over the insulating layer to snugly surround and maintain the insulating layer around the longitudinal portion of the rigid conduit.

9. The insulated tube as defined in claim 8, wherein the elongated contractible braided sleeve compresses the insulating layer around all the longitudinal portion of the conduit.

10. The insulated tube as defined in claim 8, wherein the contractible braided sleeve includes a braided material made of at least one of high temperature glass fibers, stainless steel, nickel-plated copper, silver-plated copper, and heat-treated aluminium coated fibreglass.

11. The insulated tube as defined in claim 8, wherein the insulating layer includes a layer of insulating tape.

12. The insulated tube as defined in claim 8, wherein the insulating layer includes a layer containing at least one of glass fiber, ceramic material and silica-based fiber.

* * * * *